H. F. BRUCK.
ATTACHMENT FOR FOOD GRINDERS.
APPLICATION FILED APR. 7, 1922.
1,427,719.
Patented Aug. 29, 1922.
2 SHEETS—SHEET 2.
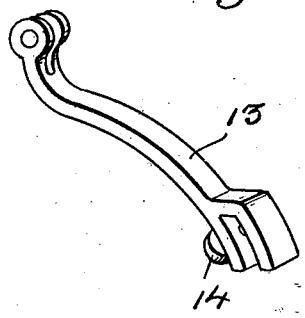
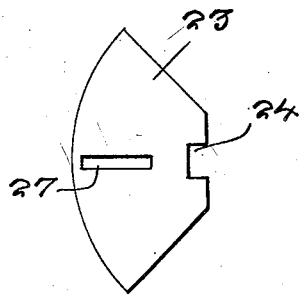
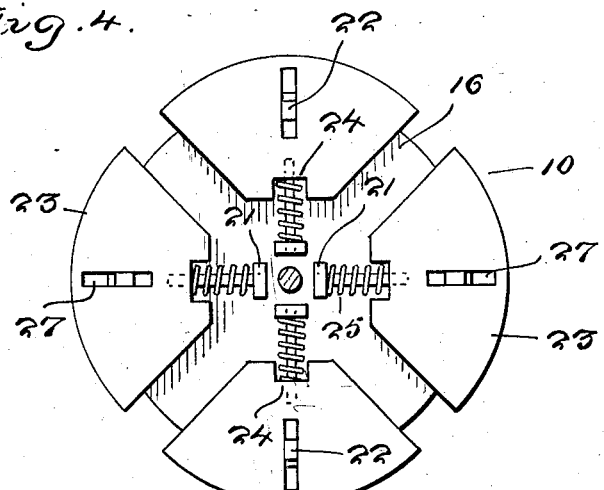
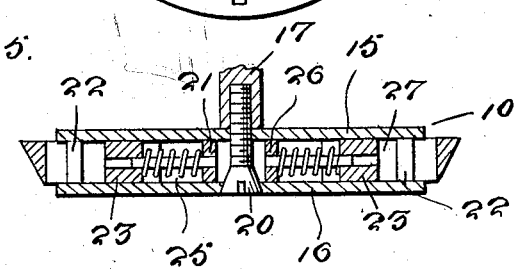

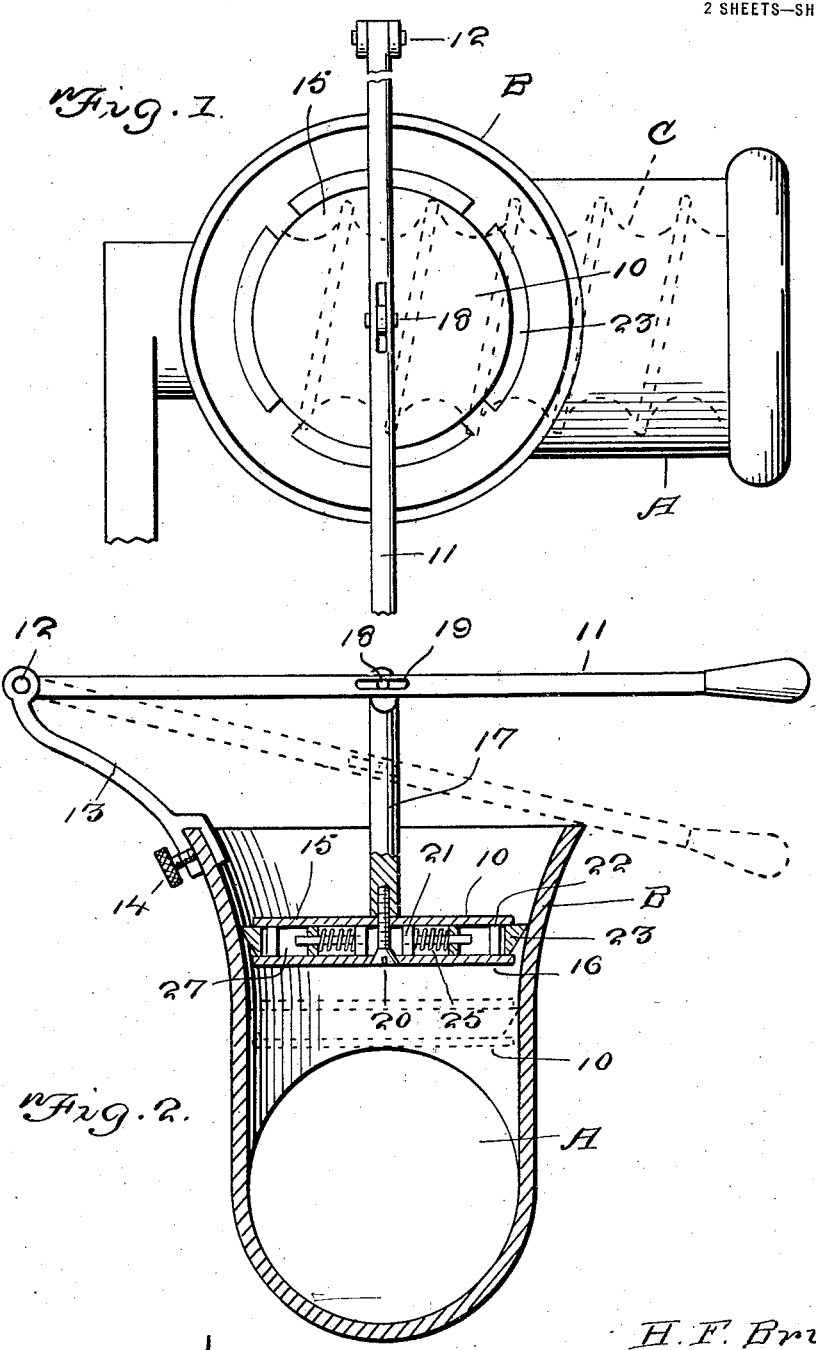

UNITED STATES PATENT OFFICE.

HERMAN F. BRUCK, OF GALION, OHIO.

ATTACHMENT FOR FOOD GRINDERS.

1,427,719.  Specification of Letters Patent.  Patented Aug. 29, 1922.

Application filed April 7, 1922. Serial No. 550,392.

*To all whom it may concern:*

Be it known that I, HERMAN F. BRUCK, a citizen of the United States, residing at Galion, in the county of Crawford and State of Ohio, have invented new and useful Improvements in Attachments for Food Grinders, of which the following is a specification.

The invention relates to attachments for food grinders such as are used by butchers and housekeepers for grinding up meats, vegetables, fruits, and other articles of food, and has for its object the provision of a feed device for forcing the material down into the grinder so that it will be properly engaged by the auger conveyor and be carried to the cutter and die plate.

An improtant object is the provision of a feed device of this character which is formed as a species of follower which may be pressed into the entrance portion of the grinder and which is provided with a lever whereby pressure may be applied to the food material for forcing it to the cutter, the device being of great advantage in preventing the operator from pressing the material down with his fingers with the possible result of mutilating them by catching in the cutter.

Another object is the provision of a device of this character in which the follower is provided with a plurality of outwardly spring-pressed shoes which firmly engage against the wall of the feed portion of the grinder for making a close fit which will prevent food material from passing between the follower and the wall of the grinder.

An additional object is the provision of a device of this character which will be simple and inexpensive in manufacture, which will be clamped upon an already existing grinder, which will be positive in action, easy in operation, durable in service, and a general improvement in the art.

With the above and other objects and advantages in view, the invention consists in the details of construction to be hereinafter more fully described and claimed and illustrated in the accompanying drawings in which—

Figure 1 is a plan view of a food grinder having my device applied thereto.

Figure 2 is a cross sectional view through the grinder showing my device in position, the highest point of the follower being represented.

Figure 3 is a detail perspective view of the clamp.

Figure 4 is a horizontal sectional view taken through the follower itself.

Figure 5 is a detail sectional view through the follower.

Figure 6 is a perspective view of one of the radially movable shoes.

Referring more particularly to the drawings, the letter A designates a food grinder of conventional type which includes the usual upstanding feed portion B which is of flaring shape, as well known, and which is further provided with the usual auger cutter C. Ordinarily when food material is placed within the feed portion B it is pressed down by means of the fingers or else by means of a small wooden pestle, a knife handle, or the like. It is well known that the former method is dangerous to the operator as the fingers frequently become caught in the cutter and become mutilated. It is also well known that the use of the knife handle, knife blade, pestle, or the like, is also unsatisfactory inasmuch as these articles frequently catch in the cutter and cause damage thereto.

In carrying out my invention I provide a feeding device which consists of a follower designated broadly by the numeral 10, which is moved up and down by means of a lever 11, which is pivoted at 12 upon a clamp 13 which is engaged upon one side of the feed portion B of the grinder and held thereon by means of a screw 14. This lever is of considerable length and is engageable with the opposite side of the feed portion B for limiting its downward movement.

The follower itself comprises a pair of spaced upper and lower plates 15 and 16, respectively, against the upper of which is secured a standard 17 which is connected with the lever by means of a pin 18 passing through a slot 19. The lower end of the standard is connected with the follower by means of a screw 20 which is threaded through the plates 16 and 15 and upwardly into the standard. Located between and secured to or formed upon the plates 15 and 16 are spacers 21 which operate to hold the plates in their proper relative positions. These plates are also connected at various points by means of upstanding pins 22.

Slidable between the plates 15 and 16 are radially movable shoes 23 which have their inner ends formed with recesses 24 within which are engaged the outer ends of coil springs 25 which have their inner ends seating within sockets 26 formed in the members 21. These shoes are formed with elongated slots 27 through which pass the guide pins 22, the inward and outward movement of the shoes being limited by the engagement of the ends of the slots with these pins 22.

In the use of the device the clamp 13 is engaged upon the feed portion B of the grinder and held thereon by means of the clamping screws 14. Material to be ground is placed within the feed portion B in the usual manner and the follower 10 is then engaged upon the top of the mass of material. To feed the material to the cutter, the operator presses down upon the lever 11 which causes the follower to be forced down through the feed portion B of the machine, carrying or forcing the material downwardly also. When the follower reaches a point immediately adjacent the cutter the lever 11 will engage against the top edge of the feed portion of the machine and limit the downward movement of the follower so that the latter can never at any time come in engagement with the cutter. It is to be noted that the feed portion of the device is flaring but it is also to be observed that owing to the fact that the shoes 23 are capable of having radial movement, they will be moved in or out depending upon the flare of the feed portion and will always contact with the inner wall thereof so that there will be no space through which the material being forced down may escape. When refilling the device it is merely necessary that the operator swing the lever 11 upwardly upon its pivot 12 and withdraw the follower entirely from the grinder so that refilling may be easily accomplished.

From the foregoing description and a study of the drawings it will be apparent that I have thus provided a simply constructed and consequently inexpensive feed device which may be readily attached to already existing food grinders for the purpose of forcing down the material to be ground, into engagement with the cutter. It will be observed that the construction of the device is such that additional supplies of material may be placed in the grinder with the utmost ease without any interference with the feed device. It is also observable that owing to the provision of the radially movable spring-pressed shoes the device may be used in association with grinders of different sizes so that it will have a wide range of adaptability and utility.

While I have shown and described the preferred embodiment of my invention, it is of course to be understood that I reserve the right to make such changes in the form, construction and arrangement of parts as will not depart from the spirit of the invention or the scope of the subjoined claims.

What is claimed is:—

1. A feed attachment for food grinders comprising a clamp detachably engageable upon an edge of the feed portion of a grinder, a lever pivoted upon said clamp, a follower designed to pass within the feed portion of the grinder, and a connection between the follower and the lever, said follower including upper and lower supporting plates and a plurality of radially movable spring-pressed shoes slidable therebetween.

2. A feed attachment for food grinders comprising a clamp detachably engageable upon an edge of the feed portion of a grinder, a lever pivoted upon said clamp, a follower designed to pass within the feed portion of the grinder, and a connection between the follower and the lever, said follower including upper and lower supporting plates, a plurality of radially movable spring-pressed shoes slidable therebetween, and means for limiting the outward and inward movement of the shoes 3. A feed attachment for food grinders comprising a clamp detachably engageable upon an edge of the feed portion of a grinder, a lever pivoted upon said clamp, a follower designed to pass within the feed portion of the grinder, and a connection between the follower and the lever, said follower including upper and lower supporting plates, a plurality of radially movable spring-pressed shoes slidable therebetween, and means for limiting the outward and inward movement of the shoes including pins extending transversely between said plates, and the shoes being formed with elongated slots through which said pins pass.

4. A device of the character described comprising a clamp designed to be engaged upon the edge of the feed portion of a food grinder, a lever pivoted upon said clamp, a follower consisting of spaced plates and a plurality of radially movable spring-pressed shoes movable therebetween and engaging against the inner wall of the feed portion of the grinder, a standard secured to said follower, and a slot and pin connection of the standard with the lever.

In testimony whereof I affix my signature.

HERMAN F. BRUCK.